United States Patent [19]

Hsu

[11] Patent Number: 5,230,849
[45] Date of Patent: Jul. 27, 1993

[54] ELECTROCHEMICAL CONVERTER ASSEMBLY AND OVERLAY METHODS OF FORMING COMPONENT STRUCTURES

[75] Inventor: Michael S. Hsu, Roundhill Rd., Lincoln, Mass. 01773

[73] Assignee: Michael S. Hsu, Lincoln, Mass.

[21] Appl. No.: 710,767

[22] Filed: Jun. 4, 1991

[51] Int. Cl.$^5$ ............................................. C23C 4/00
[52] U.S. Cl. .................... 264/104; 427/115; 427/126.1; 427/126.3; 427/126.6; 427/331; 427/272; 427/282
[58] Field of Search ................. 427/115, 126.1, 126.3, 427/126.6, 331, 272, 282; 264/104

[56] References Cited

U.S. PATENT DOCUMENTS

| | | | |
|---|---|---|---|
| 3,460,991 | 8/1969 | White, Jr. | 136/86 |
| 4,614,628 | 9/1986 | Hsu et al. | 264/61 |
| 4,629,537 | 12/1986 | Hsu | 204/15 |
| 4,721,556 | 1/1988 | Hsu | 204/258 |
| 4,789,561 | 12/1988 | Schaefer | 427/126.1 |
| 4,812,329 | 3/1989 | Isenberg | 427/115 |
| 4,853,100 | 8/1989 | Hsu | 204/256 |
| 4,857,420 | 8/1989 | Maricle et al. | 429/30 |
| 4,883,497 | 11/1989 | Claar et al. | 29/623.5 |
| 4,913,982 | 4/1990 | Kotchick | 427/115 |
| 5,021,304 | 6/1991 | Ruka | 427/115 |
| 5,073,405 | 12/1991 | Vasilow | 427/115 |
| 5,080,689 | 1/1992 | Pal | 427/115 |
| 5,085,742 | 2/1992 | Dollard | 427/115 |
| 5,106,654 | 4/1992 | Isenberg | 427/115 |

FOREIGN PATENT DOCUMENTS

WO8808045 7/1988 PCT Int'l Appl. .

OTHER PUBLICATIONS

Balachandran et al. (1989) "Material and Fabrication Challenges in the Development of Monolithic Solid Oxide Fuel Cells" in vol. 3 *Proceedings of the 24th Intersociety Energy Conversion Engineering Conference,* IEEE.

*Primary Examiner*—Shrive Beck
*Assistant Examiner*—Vi Duong Dang
*Attorney, Agent, or Firm*—Thomas J. Engellenner

[57] ABSTRACT

Disclosed is a method of forming a high performance, electrochemical components. The plate is manufactured by forming a first electrode material on a substrate. Next, a thin electrolyte or interconnector coating is deposited on the electrode material. In the final step, a second electrode material is deposited on the electrolyte or interconnector, and the complete structure is removed from the substrate. The electrolyte/electrodes plates and interconnector plates formed by the method of this invention may be used in the manufacture of electrochemical converters.

37 Claims, 6 Drawing Sheets

ELECTROCHEMICAL CONVERTER ASSEMBLY AND OVERLAY METHODS OF FORMING COMPONENT STRUCTURES

BACKGROUND OF THE INVENTION

This invention relates to electrochemical converters employing solid oxide electrolytes and methods for making the same, as well as assemblies employing such components or methods.

Electrochemical converters perform fuel-to-electricity conversions in a fuel cell (electric generator) mode and electricity-to-fuel conversions in an electrolyzer (fuel synthesizer) mode. The converters are capable of high efficiency depending only on the relation between the free energy and enthalpy of the electrochemical reaction. The converters are not limited by Carnot-cycle considerations.

The key components in an electrochemical energy converter are a series of electrolyte units onto which electrodes are applied and a similar series of interconnectors disposed between the electrolyte units to provide serial electrical connections. Each electrolyte unit is an ionic conductor with low ionic resistance allowing the transport of an ionic species from one electrode-electrolyte interface to the opposite electrode-electrolyte interface under the operating conditions of the converter.

It is known that solid oxide electrolytes, such as zirconia, stabilized with compounds, such as magnesia, calcia, or yttria can satisfy these requirements when operating at high temperatures, e.g., about 1,000° C. These electrolyte materials utilize oxygen ions to carry electrical current. The electrolyte should not be conductive to electrons which can cause a short-circuit of the converter. On the other hand, the interconnector must be a good electron conductor.

The interaction of the reacting gas, electrode, and electrolyte occurs at the electrode-electrolyte interface which requires that the electrodes be sufficiently porous to admit the reacting gas species and to permit exit of product species.

Electrochemical converters are further described in U.S. Pat. Nos. 4,614,628; 4,629,537 and 4,721,556, all of which are hereby incorporated by reference. In particular, U.S. Pat. No. 4,614,628 discloses solid oxide electrolyte structures and methods of their formation. According to this reference, such electrolyte structures are prepared by (1) forming a solid oxide electrolyte layer upon a substrate by plasma deposition; (2) removing the solid oxide layer from the substrate; (3) sintering the solid oxide layer; (4) depositing a fuel electrode material on one surface of the sintered solid oxide layer; and (5) depositing an oxidizer (or air) electrode material on a second surface of the sintered solid oxide layer.

Although the structures formed according to this method are satisfactory, the step of sintering involves additional cost and is time consuming. With this method, there is also the disadvantage of relatively low yields due to possible damage to the electrolyte in handling it during processing following step 2. Similar problems are encountered when manufacturing interconnector plates, particularly when conductive ceramic materials are used. It would, thus, be desirable to provide an alternative method of modified procedures and/or sequences for forming such structures.

Accordingly, it is an objective of the invention to provide more economical and reliable methods of manufacturing solid oxide electrolyte and/or interconnector structures for use in electrochemical energy converters. It is also an objective of the invention to provide methods which minimize the risk of damage to or destruction of the plates during their formation. These and other objectives of the invention will be apparent to one skilled in the art from the disclosure which follows.

SUMMARY OF THE INVENTION

Electrolyte and/or interconnector structure for use in electrochemical converter assemblies can be economically fabricated by overlaying or sequential deposition of component layers, such that a multilayer structure is first built up on a substrate and removed as an integrated component. These components can then be assembled into stacks by interleaving at least one such multilayer structure (e.g., an electrode-electrolyte-electrode component) with a mating structure (e.g., an interconnector).

In one embodiment of the present invention, solid oxide electrolyte structures are manufactured by (1) depositing a porous anode (fuel electrode) layer upon a substrate material which provides structural support and thermal stress protection; (2) overlaying a thin electrolyte coating onto the deposited anode layer by deposition onto the anode's exposed surface while it is supported by the substrate; and (3) then overlaying a porous cathode (oxidizer or air electrode) layer onto the exposed surface of the electrolyte coating. After the cathode material is applied, the completed electrolyte plate can be removed from the substrate and is ready for use in the assembly of a solid oxide electrochemical converter.

The order of layers described above, of course, can be reversed, such that the cathode layer is first deposited, followed by the electrolyte and then the anode.

In another embodiment of the present invention, integrated interconnector structures are manufactured by (1) depositing a porous anode (fuel electrode) layer upon a substrate material which provides structural support and thermal stress protection; (2) overlaying a conductive interconnector coating to the deposited anode layer by deposition onto the anode's exposed surface while it is supported by the substrate; and (3) then overlaying a porous cathode (oxidizer or air electrode) layer onto the exposed surface of the interconnector coating. After the cathode material is applied, the completed interconnector plate can be removed from the substrate and is, likewise, ready for use in the assembly of a solid oxide electrochemical converter.

The overlay techniques of the present invention permit the fabrication of components with substantially fewer processing and handling steps, thereby increasing yield and economy in manufacture. Moreover, when plasma deposition is utilized in the fabrication of the multilayer components, plates with a material density as high as about 99.9% can be obtained, eliminating the need for high temperature sintering. This method also facilitates the preparation of extremely thin layers, which is particularly useful in the fabrication of stacks of component plates.

The complete stacks can also be fabricated by overlay processing of the present invention with alternating electrolyte/electrodes structures and interconnector structures, followed by removal of a single multi-cell structure from the substrate.

DETAILED DESCRIPTION

The electrochemical components of the present invention are manufactured according to a simplified process which reduces the risk of plate damage during manufacturing.

Figure 1A:
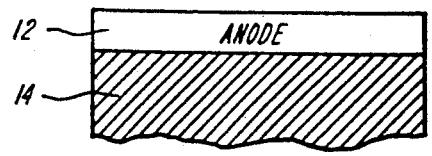
FIGS. 1A, 1B, 1C, and 1D are schematic diagrams illustrating the steps of preparing a multilayer solid oxide electrolyte/electrodes plate according to one method of the present invention.
Figure 1B:
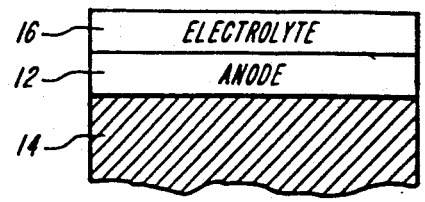
Figure 1C:
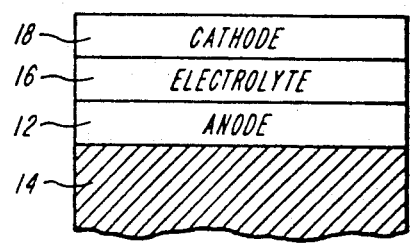
Figure 1D:
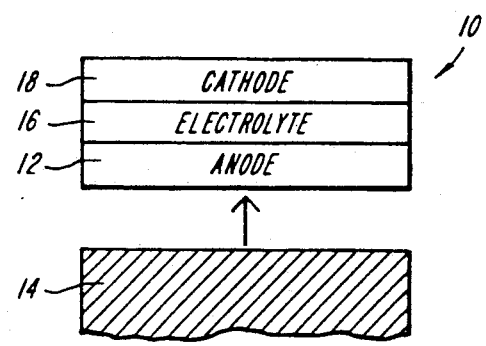

As shown in FIGS. 1A, 1B, 1C and 1D, an electrolyte/electrodes plate 10 is prepared by first depositing an anode (fuel electrode) material 12 upon a solid substrate 14 by a technique, such as plasma deposition, as shown in FIG. 1A. After the anode material 12 solidifies, a electrolyte coating 16 is overlaid onto the exposed surface of the anode 12, again by plasma deposition or the like, as shown in FIG. 1B. A cathode (oxidizer electrode) material 18 is then applied upon the electrolyte coating 16, again preferably by deposition, as shown in FIG. 1C. The resultant electrolyte/electrodes plate 10, as shown in FIG. 1D, is then separated from the substrate, for example, by mechanical or manual means.

Figure 2A:
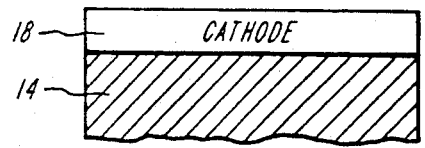
FIGS. 2A, 2B, 2C, and 2D are schematic diagrams illustrating the steps of preparing an alternative multilayer solid oxide electrolyte/electrodes Plate according to another method of the present invention.
Figure 2B:
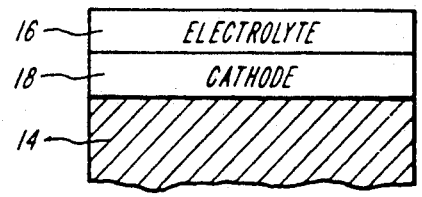
Figure 2C:
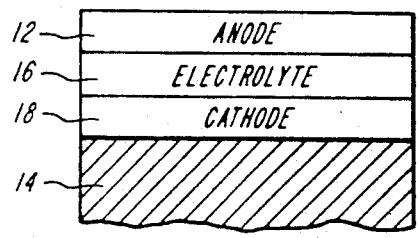
Figure 2D:
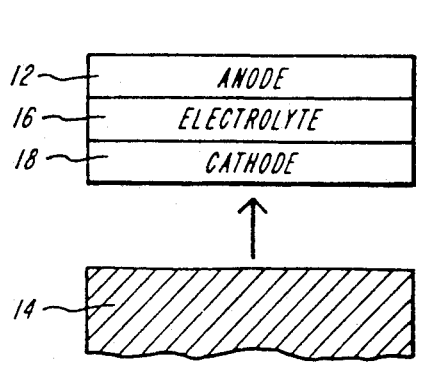

In FIGS. 2A, 2B, 2C and 2D, a similar electrolyte/electrodes plate 10A is formed by reversing the sequence of steps, i.e., by first depositing a cathode (oxidizer electrode) material 18 in FIG. 2A, followed by the deposition of an electrolyte layer 16 in FIG. 2B, and then the anode (fuel electrode) layer 12 in FIG. 2C. Following completion of the anode deposition, the plate 10A is removed from the substrate 14, as shown in FIG. 2D.

Figure 3A:
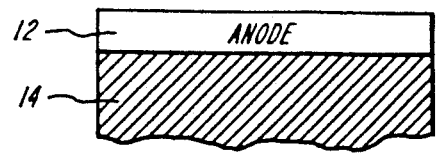
FIGS. 3A, 3B, 3C, and 3D are schematic diagrams illustrating the steps of preparing a multilayer interconnector plate according to one method of the present invention.
Figure 3B:
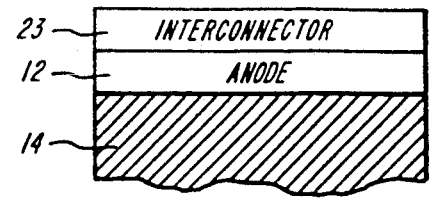
Figure 3C:
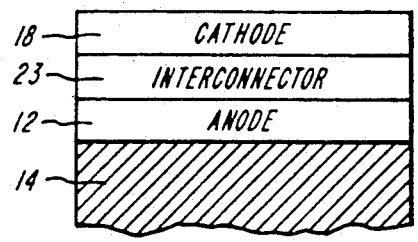
Figure 3D:
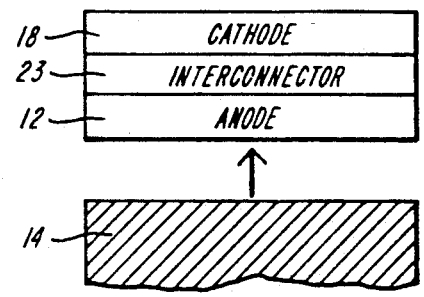

In FIGS. 3A, 3B, 3C and 3D, an interconnector plate 21 is prepared by first depositing an anode (fuel electrode) material 12 upon a solid substrate 14 by a technique, such as plasma deposition, as shown in FIG. 3A. After the anode material 12 solidifies, an interconnector coating 23 is overlaid onto the exposed surface of the anode 12 by plasma deposition or the like, as shown in FIG. 3B. A cathode (oxidizer electrode) material 18 is then applied upon the interconnector coating 23, again preferably by deposition, as shown in FIG. 3C. The resultant interconnector plate 10, as shown in FIG. 3D, is then separated from the substrate, for example, by mechanical or manual means.

Figure 4A:
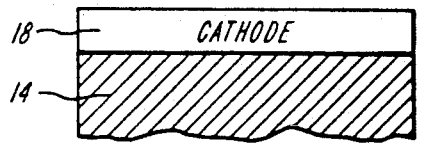
FIGS. 4A, 4B, 4C, and 4D are schematic diagrams illustrating the steps of preparing an alternative multilayer interconnector plate according to another method of the present invention.
Figure 4B:
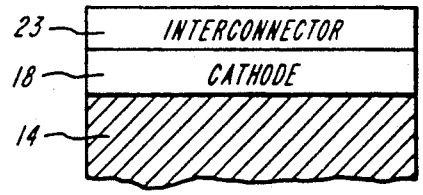
Figure 4C:
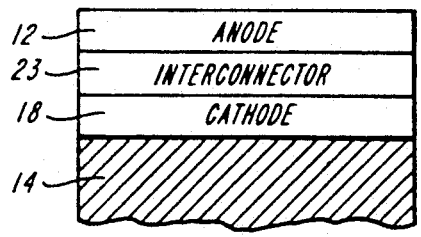
Figure 4D:
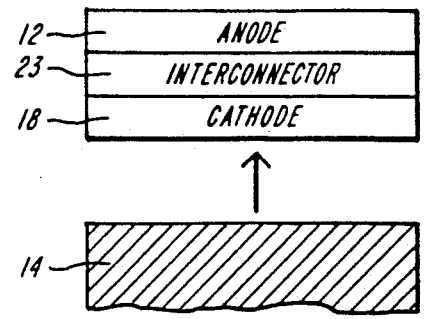

In FIGS. 4A, 4B, 4C and 4D, a similar interconnector plate 21A is formed by reversing the sequence of steps, i.e., by first depositing a cathode (oxidizer electrode) material 18 in FIG. 4A, followed by the deposition of an interconnector layer 16 in FIG. 4B, and then the anode (fuel electrode) layer 12 in FIG. 4C. Following completion of the anode deposition, the plate 21A is removed from the substrate 14, as shown in FIG. 4D.

Cermets are preferred materials for use in forming the anode layers of the present invention, including, for example, $ZrO_2/Ni$ or $ZrO_2/NiO$. The cathode material preferably comprises a perovskite material, such as $LaMnO_3(Sr)$. The electrolyte formed as an overlaid layer as shown in FIGS. 1A-1D and 2A-2D comprises a ceramic, such as zirconia stabilized with a material selected from the group consisting of magnesia, calcia, yttria and mixtures thereof. When the interconnector is formed as a multilayer structure, as shown in FIGS. 3A-3D and 4A-4D, it can be made of a metal, metal oxide, alloy, cermet, or carbide. Exemplary conductive interconnect materials include, platinum, Inconel, nickel alloys, $La(Sr)CrO_3$ cermets and SiC. Typically, each of these layers (e.g., anode, cathode, electrolyte and/or interconnector) is applied at a thickness ranging between about 25 $\mu$m to 250 $\mu$m.

As noted above, the individual layers of the overlaid structures can be formed by plasma deposition. In this technique, the material to be deposited is typically suspended as a powder in a working gas, and the suspension is then passed through an arc discharge. The material particles are heated to a molten state and ejected from a nozzle onto the substrate or previously deposited layer. This technique is well-known in the art, and various systems which facilitate it are commercially available, including, for example, the Bay State Plasma Spray System manufactured by Bay State Abrasives, Westborough, Mass. Alternatively, deposition can be achieved by other means, including, thermal plasma deposition and chemical deposition methods.

The substrate material, which is reusable, preferably comprises a materials, such as copper, aluminum or carbon. The complete electrolyte/electrodes and/or interconnector plates can be removed from the substrate by various techniques, including mechanical impact or thermal quenching.

Figure 5A:
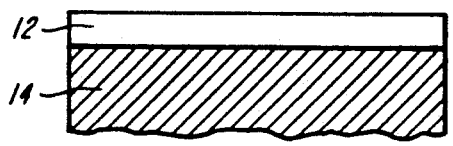
FIGS. 5A, 5B, 5C and 5D are schematic diagrams illustrating an alternative method of forming a solid oxide electrolyte/electrodes plate or interconnector plate having channels formed in the top electrode layer.
Figure 5B:
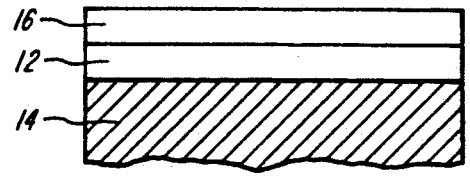
Figure 5C:
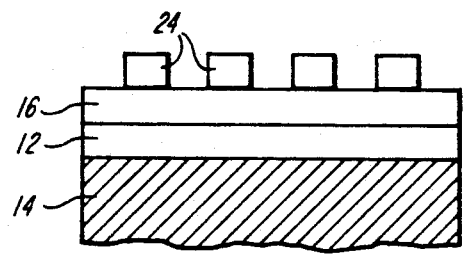
Figure 5D:
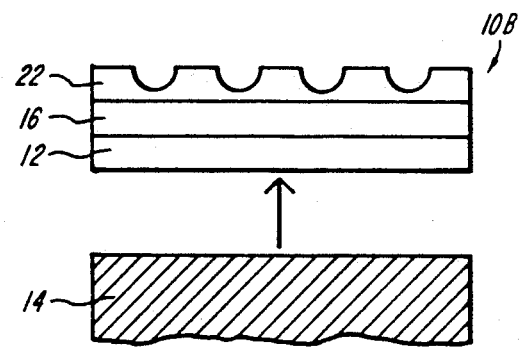

In an alternative method shown in FIGS. 5A, 5B, 5C and 5D, one or the other electrode (e.g., the cathode 22) can be formed with a pattern of flow channels using masking techniques familiar to those skilled in the art. In particular, once the electrolyte layer 16 solidifies (or after an electrode layers is partially deposited), a spray-on or screen-on or mechanical mask material 24 can be selectively applied to prevent the localized build-up of the cathode material 22 (FIG. 5B). Following deposition of the cathode layer 22, the mask 24 can be removed by thermal or chemical means to expose the channel profile (FIG. 5C). When the mask 24 is removed, the now channeled plate 10B can be removed from the substrate 14 using the techniques described. Alternatively, channels can be formed after the electrode layer is deposited by masking the top of the structure and then selectively etching away portions of the electrode to create channels.

It is understood, of course, that the sequence of application of the anode material and the cathode material described above with respect to channeled structures can again be reversed. That is, the cathode material may be initially applied to the substrate followed by deposition of the electrolyte and anode materials and then the creation of a network of gas passage channels in the anode layer. Likewise, channel can also be formed in either the anode or cathode layers of multilayer interconnector plates, as well.

The plate structures of this invention can be utilized in an electrochemical energy converter wherein the electrolyte/electrodes plates and interconnector plates are stacked in alternating relationship.

Figure 6:
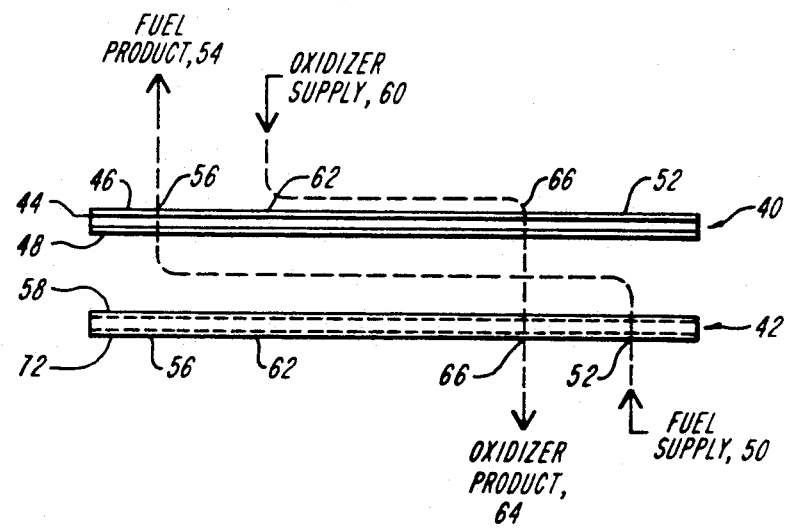
FIG. 6 is a cross-sectional view of an electrochemical cell utilizing the structure of this invention.
Figure 7:
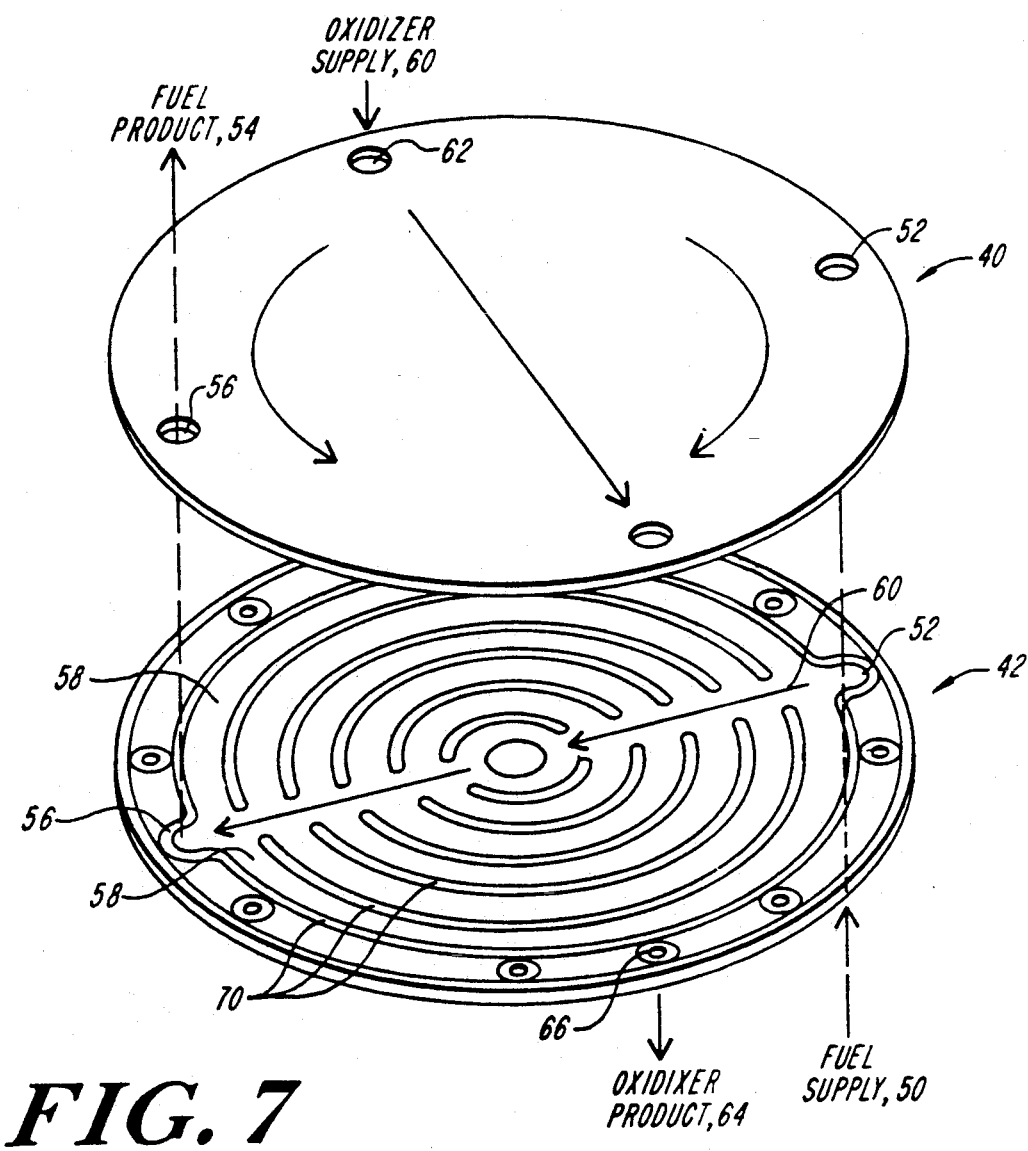
FIG. 7 is an isometric top view of the structure of this invention utilized in the cell of FIG. 6.

In FIGS. 6 and 7, the basic cell unit in the electrochemical cell stack is shown to comprise an electrolyte plate 40 and an interconnector plate 42. As described in detail above, the electrolyte plate 40 is preferably manufactured of stabilized zirconia 44 having coatings of a porous oxidizer electrode 46 and porous fuel electrode 48 on opposing surfaces. The preferred materials for the oxidizer and fuel electrodes are given above. The interconnector plate 42 preferably is made of a metal, such as platinum alloy or Inconel, a nickel alloy or a conductive ceramic material, such as La(Sr)CrO$_3$ or SiC. The interconnector plate 42 provides electric connection between adjacent electrolyte plates and forms a partition between the fuel and oxidizer gases. Plate 42 also provides a heat conduction path from the electrode surfaces 46 and 48 to the outer edges of both plates 40 and 42.

As shown in FIG. 7, fuel is supplied to the cell stack through an axial manifold 50 coupled to the stack via holes 52; the fuel product is exhausted through manifold 54 via holes 56. The fuel is distributed over the fuel electrode surface 48 through an in-plane groove network 58 formed in the upper surface of the interconnector plate 42. The notches 60 made in ridges 70 provide openings into the groove network 58 connecting holes 52 and 56 at the surface of each fuel electrode 48. The oxidizer is fed into the stack from manifold 60 via holes 62, and its product, is exhausted through manifold 64 via holes 66. The oxidizer is distributed over the oxidizer electrode surface of the next electrolyte plate through a complementary, in-plane groove network formed in the lower surface of the interconnector plate 42 through holes 66. A similar network on the lower surface of the adjacent cell above provides the passages for the oxidizer along electrolyte plate 40. The outer ridqes of the groove networks 58 (the upper visible side as shown in FIG. 7) and 72 (on the lower hidden side, see FIG. 6) on the interconnector plates 42 are brought in contact with electrolyte plates 40 to form the sealed outer walls of the stack assembly. The ridges 70 are pressed against the electrodes in assembly to achieve electrical contacts. The stack can be secured by water-cooled tension rods (not shown) to provide the assembly force.

Figure 8:
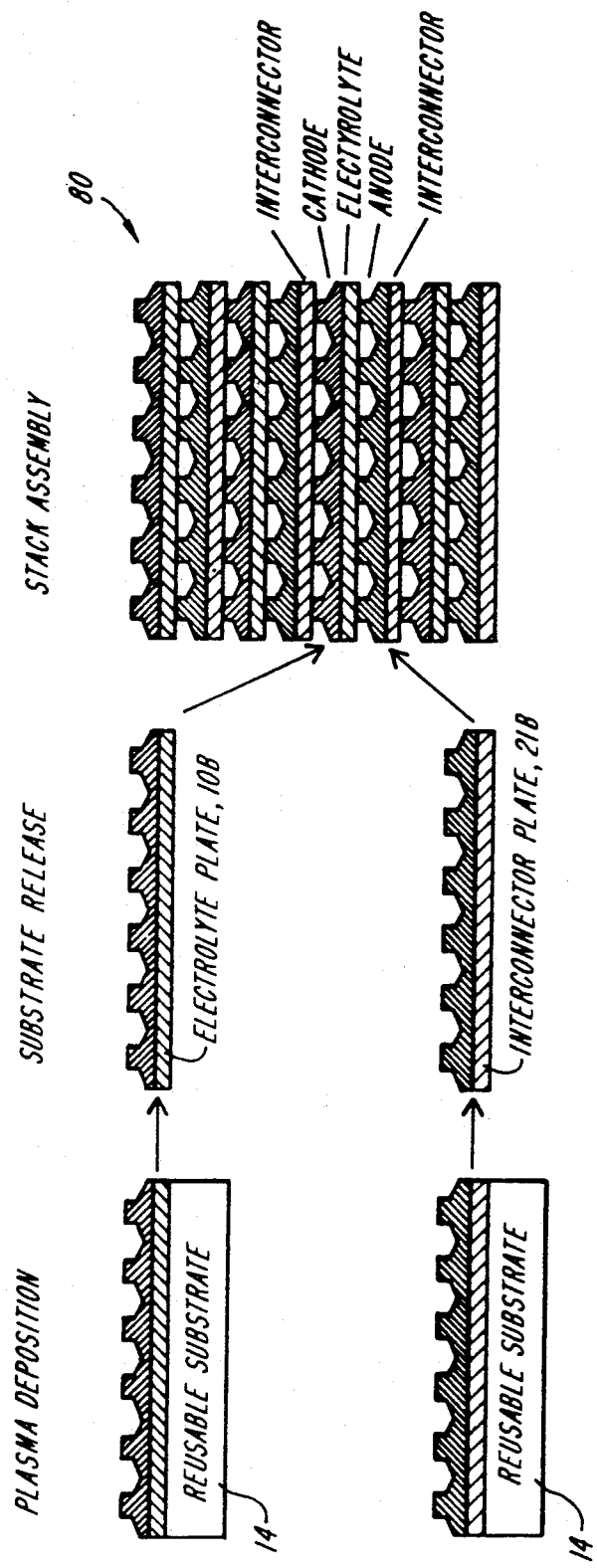
FIG. 8 is a schematic illustration of an exemplary assembly of component structures according to the invention.

In FIG. 8, an exemplary scheme for assembling cell stacks is shown. In this approach, an electrolyte/electrodes plate 10B having a channeled cathode electrode layer is formed, as described above in FIGS. 1 and 5. A similarly fabricated interconnector plate 21B having a channeled anode electrode is also formed in accordance with the teachings of the present invention, and then the plates are stacked, interleaving the electrolyte/electrodes and interconnector elements, such that the anodic layers of adjacent components are joined, then the cathodic layers are joined, then the process is repeated over and over again to create the stack assembly 80.

Obviously, various alternative stacking arrangements can also be implemented. For example, the electrolyte/electrodes plates can be formed with channeled cathode layer while the interconnectors are formed with channeled anodes.

Alternatively, one of the components (e.g., with the electrolyte or the interconnector) can be fabricated without channels (flat or even bare of cathode and anode layers) and all of the channels formed in alternating layers of the other component.

As an extended overlay technique, a stack of alternating electrolyte/electrodes structure and interconnector structural can be compiled and then removed as a single structure from the substrate.

Figure 9:
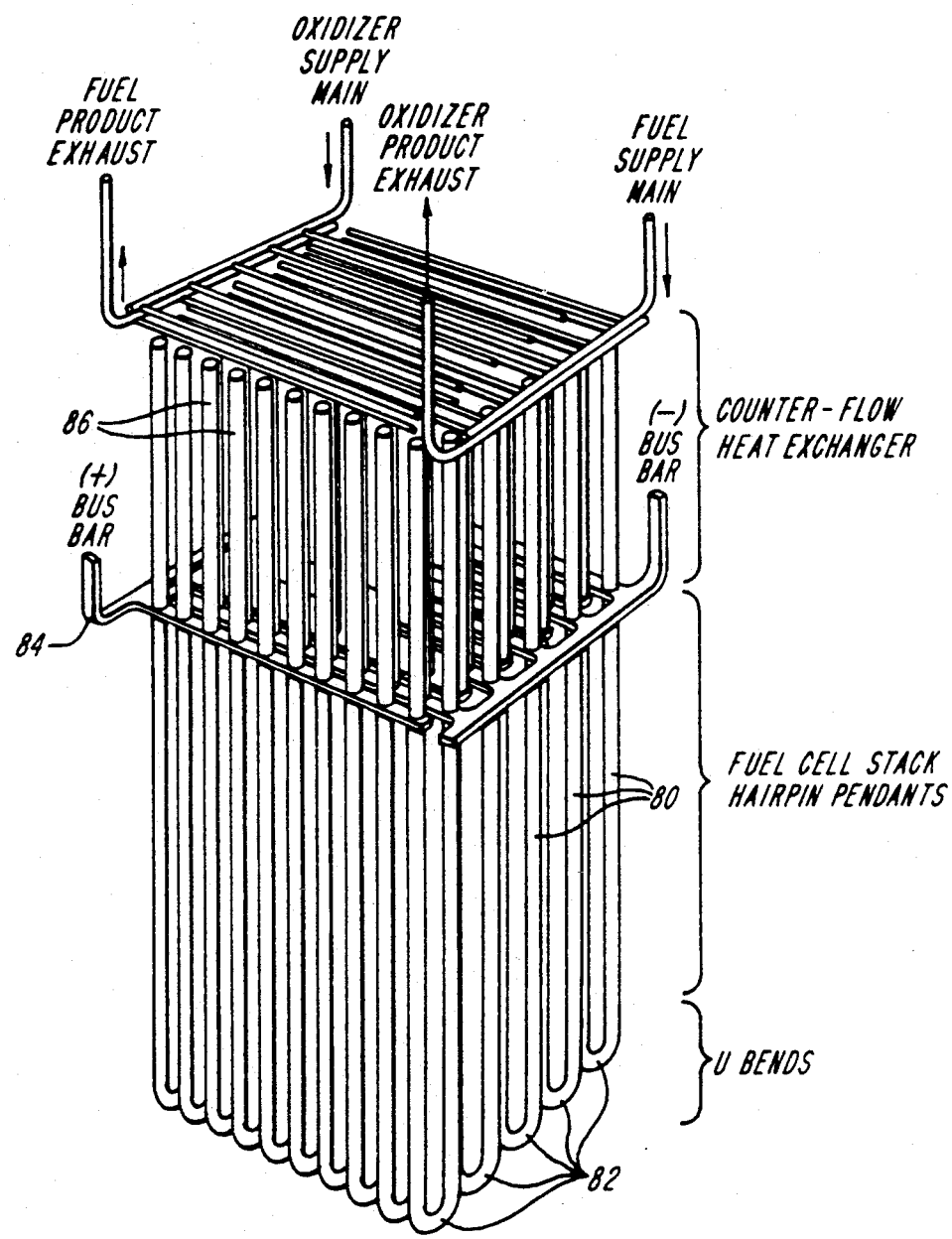
FIG. 9 is an isometric view of an electrochemical energy converter utilizing the structure of this invention, which includes a heat exchanger.

Referring to FIG. 9, the above-described electrochemical cell stacks can be coupled to form hairpin pendants 80 with U bends 82 to achieve better structural rigidity while also allowing thermal expansion in the free ends and more convenient one-side terminations for gas manifolding and electric connections. Bus bars 84 are provided to tap or supply electricity to the electrochemical pendants 80 which are in multiple parallel electrical connections.

The electrochemical cells operate efficiently at an elevated temperature (approximately 1800° F. or 1000° C.). The input and exhaust of gases operates, as described above, with regard to FIGS. 6 and 7. Heat exchanger stacks 86 can be provided and placed at the top of the electrochemical cell stacks. The heat exchanger serves as (1) a thermal conduction buffer between hot electrochemical cell stacks 80 and external structures; and (2) gas temperature conditioners which heat the incoming reacting gases by the outgoing product gases with a counter-flow scheme.

Although particular embodiments of this invention have been described and illustrated herein, it is recognized that modifications and variations may readily occur to those skilled in the art. Consequently, it is intended that the claims be interpreted to cover such modifications and the equivalents.

What is claimed is:

1. A process for forming a multi-layer solid oxide electrolyte/electrodes plate comprising the steps of:
   spray depositing a first electrode material on a substrate forming a first plate layer;
   spray depositing a thin electrolyte coating upon said first electrode material forming a second plate layer;
   spray depositing a second electrode material on said solid electrolyte layer forming a third plate layer; and
   removing said substrate from said deposited layers to yield a multi-layer solid oxide electrolyte/electrodes plate.

2. The process of claim 1 wherein the first electrode material is a fuel electrode.

3. The process of claim 2 wherein the fuel electrode material is ZrO$_2$/Ni or ZrO$_2$/NiO.

4. The process of claim 2 wherein the second electrode is an oxidizer electrode material.

5. The process of claim 4 wherein the oxidizer electrode material is La(Sr) MnO$_3$.

6. The process of claim 1 wherein the electrolyte is an ionic conductor.

7. The process of claim 6 wherein the electrolyte coating is $ZrO_2/(Y_2O_3)$.

8. The method of claim 1 wherein the first electrode material is an oxidizer electrode.

9. The method of claim 8 wherein the oxidizer electrode material is $La(Sr)MnO_3$.

10. The method of claim 1 wherein the second electrode material is a fuel electrode.

11. The method of claim 10 wherein the fuel electrode material is $ZrO_2/Ni$ or $ZrO_2/NiO$.

12. The method of claim 1 wherein the method further comprises forming a channel pattern in at least one of the said electrode materials.

13. The method of claim 12 including the step of forming a channel by applying a masking agent to said electrolyte layer.

14. The method of claim 13 including the step of applying an electrode material over said masking agent.

15. The method of claim 14 including the step of removing said masking agent.

16. The method of claim 12 including the further step of forming a network of substantially semicircular in-plane grooves in said channel pattern.

17. The method of claim 16 including the step of forming notched openings in said grooves.

18. The method of claim 17 including the step of allowing an input gas to flow through said in-plane groove network in contact with said electrode material.

19. A process for forming a multi-layer an interconnector plate comprising the steps of:
    spray depositing a first electrode material on a substrate forming a first plate layer;
    spray depositing a thin interconnector coating upon said first electrode material forming a second plate layer;
    spray depositing a second electrode material on said solid interconnector layer forming a third plate layer; and
    removing said substrate from said deposited layers to yield a multi-layer solid oxide interconnector plate.

20. The process of claim 14 wherein the first electrode material is a fuel electrode.

21. The process of claim 20 wherein the fuel electrode material is $ZrO_2/Ni$ or $ZrO_2/NiO$.

22. The process of claim 19 wherein the second electrode is an oxidizer electrode material.

23. The process of claim 22 wherein the oxidizer electrode material is $La(Sr)MnO_3$.

24. The process of claim 19 wherein the interconnector comprises an electronic conductive material.

25. The process of claim 24 wherein the interconnector is $La(Sr)CrO_3$.

26. The method of claim 19 wherein the first electrode material is an oxidizer electrode.

27. The method of claim 26 wherein the oxidizer electrode material is $La(Sr)MnO_3$.

28. The method of claim 19 wherein the second electrode material is a fuel electrode.

29. The method of claim 10 wherein the fuel electrode material is $ZrO_2/Ni$ or $ZrO_2/NiO$.

30. The method of claim 19 wherein the method further comprises forming a channel pattern in at least one of the said electrode materials.

31. The method of claim 30 including the step of forming a channel by applying a masking agent to said electrolyte layer.

32. The method of claim 31 including the step of applying an electrode material over said masking agent.

33. The method of claim 32 including the step of removing said masking agent is removed.

34. The method of claim 30 further including the step of forming a network of substantially semi-circular in-plane grooves in said channel pattern.

35. The method of claim 34 including the step of forming notched openings in said grooves.

36. The method of claim 35 including the step of allowing an input gas to flow through said in-plane groove network in contact with said electrode material.

37. A process for forming a composite cell stack comprising the steps of:
    a. spray depositing a first electrode material on a substrate;
    b. spray depositing a thin electrolyte coating upon said first electrode material;
    c. spray depositing a second electrode material on said solid electrolyte layer;
    d. spray depositing a thin interconnector coating upon said second electrode material;
    e. spray depositing a first electrode material on said interconnector coating;
    repeating the above cycle of steps b, c, d, and e; and
    removing said substrate to yield a composite multi-cell stack structure.

* * * * *